United States Patent
Cazanas et al.

(10) Patent No.: US 8,812,033 B2
(45) Date of Patent: Aug. 19, 2014

(54) SYSTEMS AND METHOD FOR RECOMMENDING AN APPLICATION FROM A MOBILE STATION

(75) Inventors: Carlos A. Cazanas, Bethlehem, PA (US); Brian Tims, Nazareth, PA (US); Rajeev Sadana, Green Brook, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 443 days.

(21) Appl. No.: 12/769,297

(22) Filed: Apr. 28, 2010

(65) Prior Publication Data

US 2011/0269484 A1 Nov. 3, 2011

(51) Int. Cl.
| | | |
|---|---|---|
| *H04W 4/00* | (2009.01) | |
| *H04M 1/66* | (2006.01) | |
| *H04N 21/262* | (2011.01) | |
| *G06F 15/16* | (2006.01) | |
| *G06F 9/445* | (2006.01) | |

(52) U.S. Cl.
USPC ........... 455/466; 455/411; 709/207; 709/203; 717/174

(58) Field of Classification Search
USPC ......................................................... 455/466
See application file for complete search history.

(56) References Cited

U.S. PATENT DOCUMENTS

| | | | |
|---|---|---|---|
| 2004/0034853 A1* | 2/2004 | Gibbons et al. | 717/174 |
| 2007/0233782 A1 | 10/2007 | Tali | |
| 2008/0270561 A1* | 10/2008 | Tang et al. | 709/207 |
| 2009/0007091 A1* | 1/2009 | Appiah et al. | 717/171 |
| 2009/0319848 A1* | 12/2009 | Thaper | 714/748 |
| 2010/0146442 A1* | 6/2010 | Nagasaka et al. | 715/810 |
| 2010/0233996 A1* | 9/2010 | Herz et al. | 455/411 |
| 2010/0299338 A1* | 11/2010 | Aarni et al. | 707/759 |
| 2010/0318986 A1* | 12/2010 | Burke et al. | 717/176 |
| 2011/0088026 A1* | 4/2011 | Swann | 717/173 |
| 2011/0300834 A1* | 12/2011 | Ni | 455/414.1 |

FOREIGN PATENT DOCUMENTS

WO WO2007/003045 1/2007

OTHER PUBLICATIONS

European Search Report dated Jun. 9, 2011 from corresponding European Application No. EP11003330.5.
"Starting With Brew: Binary Runtime Environment for Wireless," Qualcomm Announcement pp. 1-86 (2004).

* cited by examiner

*Primary Examiner* — Timothy Pham (57) ABSTRACT

Systems and methods for recommending an application from a mobile station are shown and described. Components of the network and components in communication with the network cooperate to confirm whether a mobile station recommended to receive the application is capable of executing the application and provisioning the application for transmission to the recommended mobile station.

24 Claims, 3 Drawing Sheets

SYSTEMS AND METHOD FOR RECOMMENDING AN APPLICATION FROM A MOBILE STATION

TECHNICAL FIELD

The present subject matter relates to distributing applications to mobile stations. In particular, the present subject matter relates systems and methods for recommending an application to a mobile station by the user of another mobile station.

BACKGROUND

As mobile station processing power continues to increase along with the speed at which applications can be downloaded over-the-air, mobile network providers are offering more and more applications for use by the end-users of mobile stations. As these catalogs of applications continue to grow, it becomes increasingly difficult for end-users to locate applications that may be of interest to them. While searching capabilities are usually provided, often the best way for an application to gain popularity is through viral marketing by other users of the application.

Often recommendations for mobile device applications are provided by word of mouth or through social networking sites. In addition, the catalogs often allow application users to post comments and rate the applications. While these current systems exist for recommending an application, it may not always be desirable to use them because they limit where and when an application can be recommend by the user.

SUMMARY

Hence, it may be useful to develop systems and methods for enabling an end-user of a mobile station to recommend an application from their mobile station. As shown and described below, the various systems and methods enable a recommendation for an application be created at the mobile station and pushed to various other mobile stations selected by the end-user of the recommending mobile station.

In one example, a method of recommending and downloading a mobile station application to an end-user of a mobile station is shown and described. The method includes receiving a mobile messaging service message recommending the mobile station application, through a mobile communication network from a recommending mobile station, and for each of the one or more mobile station identifiers, determining whether a corresponding mobile station is capable of executing the recommended mobile station application, to identify at least one mobile station corresponding to one of the identifiers as being capable of executing the recommended mobile station application. The received recommending message includes an application identifier associated with the recommended mobile station application and one or more identifiers of users of mobile stations to which to recommend the application. The method also includes storing provisioning information with respect to the recommended mobile station application to prepare the recommended mobile station application for transmission to the at least one mobile station identified as being capable of executing the recommended mobile station application and upon completion of the provisioning, transmitting a mobile messaging service message recommending the mobile station application through the mobile communication network to each mobile station identified as being capable of executing the recommended mobile station application. Also, the method includes receiving a response to the transmitted message through the mobile communication network from a responding mobile station identified as being capable of executing the recommended mobile station application and downloading the recommended mobile station application through the mobile communication network to the responding mobile station.

In some instances, the recommended application is a Binary Runtime Environment for Wireless (BREW) application. The application identifier can be an alphanumeric string, such as a keyword. The identifiers of a user of a mobile station may be a mobile directory number (MDN).

In some cases, the method also includes determining that one or more mobile station can not execute the recommended mobile station application and transmitting to the recommending mobile station an indication that one or more of the identified mobile stations is not able to execute the recommended mobile station application. Also, the method can include determining a price for the recommended mobile station application. The recommendation can occur during the purchase of the application or after the purchase of the application. Also, the recommending messaging service message can be addressed to a short code. The method can also include transmitting to the recommending mobile station an indication that one or more of the identified mobile stations is not able to execute the recommended application.

In another example, a mobile communications network is shown and described. The network includes a service creation manager device, a zone provisioning manager network device, and a group provisioning manager network device. The service creation manager device stores information related whether a mobile station can execute a recommended mobile station application. The zone provisioning network device communicates with an application server to prepare a recommended mobile station application for transmission to a mobile station. The group provisioning manager network device communicates with the service creation manager and the zone provisioning network device and is configured to perform functions. The functions can include receiving a mobile messaging service message recommending the mobile station application and receiving an indication from the service creation manager device whether each of the one or more mobile stations in recommendation messaging service message is capable of executing the recommended mobile station application. The received recommending message can include a mobile station application identifier associated with the recommended mobile station application and one or more identifiers of users of mobile stations to which to recommend the mobile station application. The functions can also include transmitting provisioning information to the zone provisioning network device. The provisioning information can be used to prepare the recommended mobile station application for transmission to one or more mobile station capable of executing the recommended mobile station application. Also, the functions can include receiving a response from the zone provisioning network device and transmitting a messaging service message to each mobile station that is capable of executing the recommended mobile station application. The message indicating that an application has been recommended. The response indicates that the provisioning is complete.

In some instances the service creation manager device, zone provisioning network device, and the group provisioning manager network device are the same device. They can also be separate devices or combined in various devices.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Functionality, systems, and methods of recommending an application using a mobile station are shown and described. The end-user of a recommending mobile station can select an application, identify a number of people to recommend the application to, and transmit a messaging service message using the mobile communications network to those selected people. Thus, the end-user of a mobile station can recommend an application to one or more other mobile station users directly from their mobile station.

Figure 1:
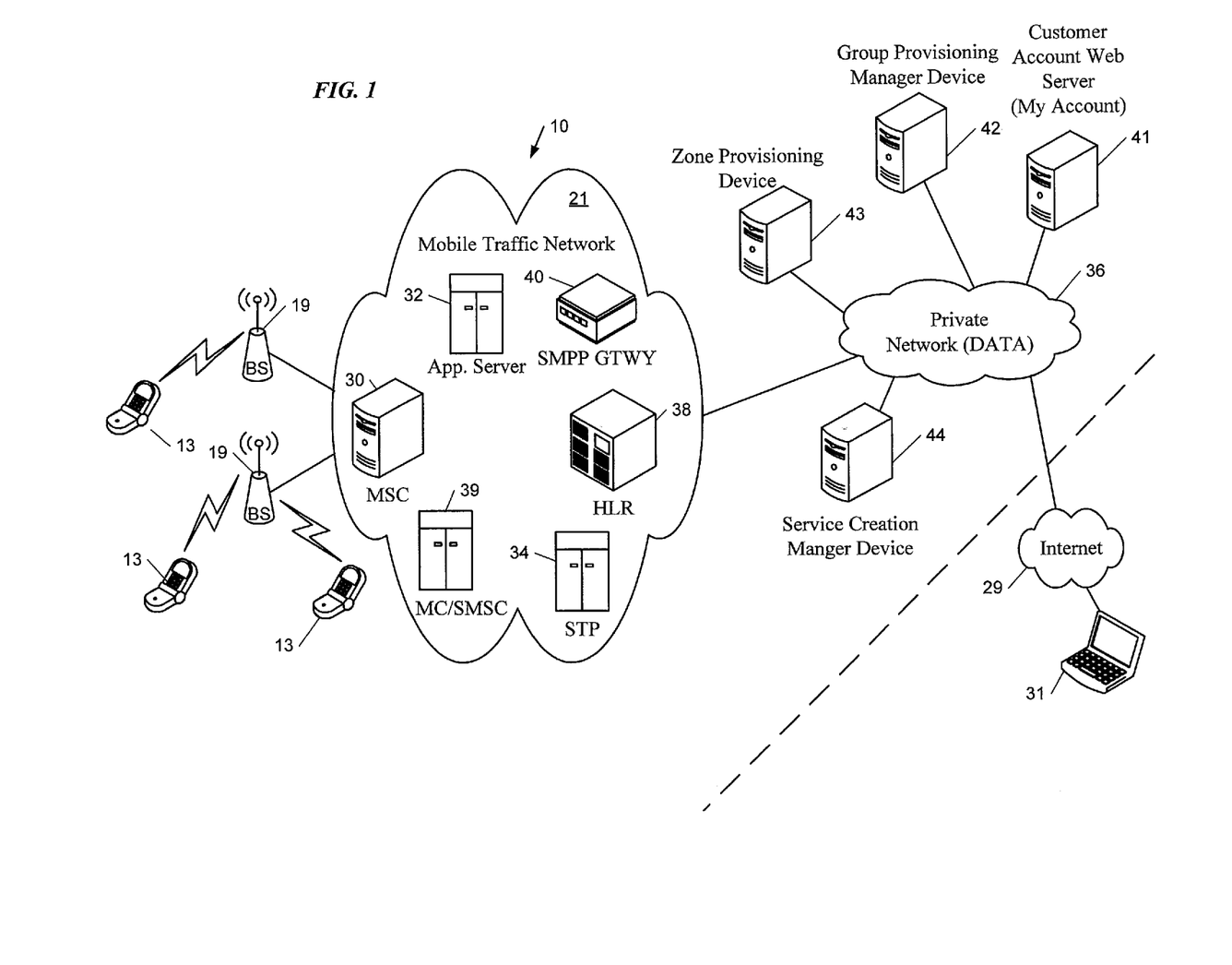
FIG. 1 is a functional block diagram that depicts various components of an exemplary mobile communications network.

Reference now is made in detail to the examples illustrated in the accompanying drawings and discussed below. FIG. 1 illustrates a mobile communication network 10 as may be operated by a carrier or service provider to provide a wide range of mobile communication services and ancillary services or features to its subscriber customers and associated mobile station (MS) users. The elements collectively indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations (not shown) outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may be capable of conventional voice telephone communications and data communications.

For purposes of later discussion, several mobile stations 13 appear in the drawing, to represent examples of the mobile stations that may receive various services via the mobile communication network 10. For example, the mobile stations 13 can receive and execute applications written in various programming languages. The mobile stations 13 also can send and receive application recommendations.

Mobile stations 13 typically take the form of portable handsets, smart-phones or personal digital assistants, although they may be implemented in other form factors The applications can be configured to execute on many different types of mobile stations 13. For example, a mobile station application can be written to execute on a binary runtime environment for mobile (BREW-based) mobile station, a Windows Mobile based mobile station, android, I-Phone, Java Mobile, or RIM based mobile station. These types of devices can employ a multi-tasking operating system.

The mobile station 13 allows the end-user to select the application and recommend it to other mobile station users. For example, the end-user can transmit a keyword or other alphanumeric string associated with the mobile station application along with one or more mobile directory numbers (MDN) in a messaging service message (e.g., an SMS message) addressed to a short code (e.g., 2777). In response, various network elements or components in communication with the mobile communications network cooperate to transmit a messaging service message (e.g., an SMS message) to mobile stations having the identified MDN(s) as their assigned directory numbers. The end-users of the mobile stations associated with the identified MDNs can choose whether to download the recommended application from an application server 32 that stores the recommended application, using their respective mobile stations.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, when the mobile stations are within range. Each base station typically includes a BTS coupled to several antennae mounted on a radio tower within a coverage area often referred to as a "cell." The BTS is the part of the radio network that sends and receives RF signals to/from the mobile stations 13 that the base station 19 currently serves.

The radio access networks also include a traffic network represented generally by the cloud at 21, which carries the user communications and data for the mobile stations 13 between the base stations 19 and other elements with or through which the mobile stations communicate. In some examples, the mobile traffic network 21 includes network elements that support application recommendation and delivery services such as mobile switching centers (MSCs) 30, signal transfer points (STP) 34, and an application server (App. Server) 32. The network can also include other elements that support functionality other than application recommendation and delivery services such as messaging service messages and voice communications. Examples of other network elements that may be used in support of messaging service message communications include, but are not limited to, message centers (MCs) 39, home location registries (HLRs) 38, simple messaging service point-to-point (SMPP) gateway 40, and other network elements such as wireless internet gateways (WIGs), and visitor location registers (VLRs) (not shown). Other individual elements such as switches and/or routers forming the traffic network 21 are omitted here form simplicity. It is understood that the various network elements can communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile station and the other elements of the network 10. In addition, the MSC 30 is responsible for handling voice calls and messaging service message requests as well as other services (such as conference calls, FAX and circuit switched data, messaging service communications, Internet access, etc.). The MSC 30 sets up and releases the end-to-end connection or session, and handles mobility and hand-over requirements during the call. The MSC 30 also routes messaging service messages to/from the mobile stations 13, typically from/to an appropriate MC 39. The MSC 30 is sometimes referred to as a "switch". The MSC 30 manages the cell sites, the voice trunks, voicemail, and SS7 links.

The message center (MC) 39, in some examples, allows messaging service messages to be exchanged between mobile telephones and other networks. For SMS messaging, for example, the MC 39 receives packet communications containing text messages from originating mobile stations and forwards the messages via the signaling resources and the signaling channels to the appropriate destination mobile stations. The MC 39 may receive messages from external devices for similar delivery to mobile stations, and the MC 39 may receive similar messages from the mobile devices and forward them to servers or terminal devices, in either case, via an Internet Protocol (IP) packet data network.

In some examples, the MC 33 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 21 to carry message traffic between a Short Message Service Center (SMSC) 39 and the mobile stations. The SMSC 39 supports mobile station to mobile station delivery of text messages. However, the SMSC 39 also supports communication of messages between the mobile stations and devices coupled to other networks. For example, the SMSC 39 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 40.

In other examples, the MC 39 can include functionality related to the Enhanced Messaging Service (EMS) or Multimedia Messaging service (MMS). An EMS message can have special text formatting (such as bold or italic), animations, pictures, icons, sound effects and special ring tones. MMS messages support the sending and receiving of multimedia messages (e.g., images, audio, video and their combinations) to (or from) MMS-enabled mobile stations. In some examples, the MC 39 can be considered in whole or in part a multimedia messaging service center (MMSC).

Although a single MC 39 is shown, a network 10 will often have many geographically dispersed MCs 39. The MCs 39 can include destination routing tables (DRTs). In essence the DRTs are databases within the MCs 39. A DRT contains a list of the MDNs which are associated with the various MCs 39. For example, a first MDN is associated with a MC 39 in Minnesota while a second MDN is associated with a MC 39 in Virginia. The DRTs are used to determine which MC 39 should attempt to deliver an incoming messaging service message to the destination MDN. For example, if a user associated with the MC in Minnesota sends an SMS to a user associated with the MC 39 in Virginia, the Minnesota MC 39 sends the SMS to the Virginia MC 33 for delivery to the destination MDN. The communication among the MCs 39 occurs using know protocols such SMPP and the like.

The HLR 38, in some examples, stores a subscriber profile for each of the wireless subscribers and their associated mobile stations 13, 15, and 17. The HLR 38 may reside in an MSC 30 or in a centralized service control point that communicates with the MSC(s) 34 via an out-of-band signaling system such as an SS7 network. The HLR 38 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 38 can also be a stand-alone device. The HLR also tracks the current point of attachment of the mobile station to the network, e.g., the identification of the MSC 30 with which the mobile station is currently registered to receive service.

The visitor location register (VLR) (not shown) is, in some examples, a temporary database of the mobile stations that have roamed into the particular area which it serves. The VLRs for a region often are implemented in or in association with a MSC 30. Each base station 19 in the network is served by a single VLR, hence a subscriber cannot be present in more than one VLR at a time. The data stored in the VLR has either been received from the HLR 38, or collected from the mobile station.

The SMPP gateway 40 provides functionality to transport messaging service messages to other mobile communication networks and also receive messaging service messages from other networks. The SMPP gateway 34 supports communications using the SMPP protocol. SMPP gateways 40 are Short Message Peer-to-Peer (SMPP) gateways 40 used to connect the wireless communication network (such as an Internal Protocol IP network on the left of the Gateway) to another network (such as a public Internet network on the right of the Gateway). The SMPP Gateway 40 allows the MC 39 to receive and send messages in IP packet format. The SMPP Gateway 40 is an entity within the wireless network 10 that acts as an intermediary between the wireless service provider network and other networks. For example, the SMPP Gateway 40 converts messages in protocol(s) used by other applications and devices, e.g. Extensible Markup Language (XML), Hypertext Mail Protocol (HTMP), etc., to and from the SMPP protocol. The SMPP messages ride on IP transport, e.g. between the SMPP Gateway 40 and the MC 39.

In addition, the traffic network portion 21 of the mobile communications network 10 connects to a private data network 36. The private data network 36 connects to the traffic network portion 21 via a gateway (not shown). The gateway can provide protocol conversions between the protocols used by the traffic network 21 and the protocols used by the private data network 36.

In communication with the private data network 36 can be various auxiliary services servers that provide additional services to the users of the network 10 and/or to operations support personnel of the service provider or carrier that operates the network 10. For example, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29.

In addition, a group provisioning manager device (GPMD) 42, a zone provisioning device (ZPD) 43, and a service creation manager device (SCMD) 44 are provided in communication with the private data network 36 for the application downloading service and the associated application recommendation functions. For discussion purposes, each of the GPMD 42, ZPD 43, and SCMD 44 can be a stand alone computing device such as a server. Also, the functionality described below with respect to each of the GPMD 42, ZPD 43, and SCMD 44 can be provided by a different computing device. That is, the GPMD 42, ZPD 43, and SCMD 44 need not be a standalone computing device in various configurations.

Figure 2:
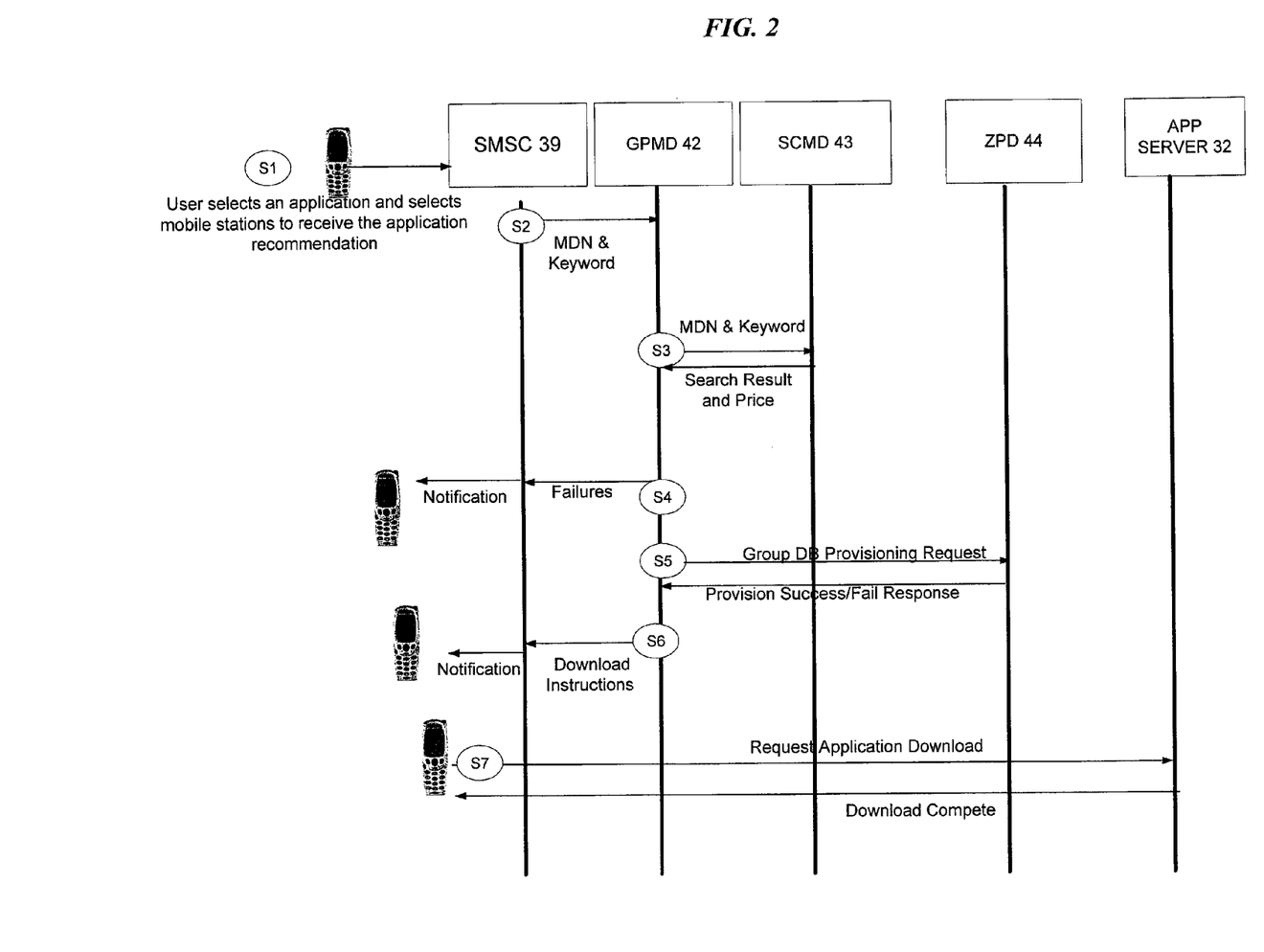
FIG. 2 is a flowchart showing various aspects of a method of recommending an application using a mobile station.

During the process of recommending an application to one or more mobile devices, the GPMD 42 coordinates and controls various actions within the recommendation process as described with respect to FIG. 2. For example, the GPMD 42 receives from the recommending mobile station 13 via one or more components of the mobile traffic network 21 (e.g., the SMSC 39) a mobile messaging service message (e.g. an SMS message) recommending the mobile station application. The message contains an application identifier (e.g., an alphanumeric string or keyword) and one or more identifiers (e.g., MDN, MIN, ESN, etc.) of other users' mobile stations selected to receive the recommendation for the mobile station application. In turn, the GPMD 42 communicates with the SCMD 44 via the private network 36 to gather and confirm various information related to the recommendation request and based on the confirmed results send recommendations in further mobile messaging service messages to the identified mobile stations 13.

The SCMD 44 maintains information about the prices for various applications and information regarding whether various makes and models of mobile stations 13 can execute any particular application selected for recommendation and/or downloading. The GPMD 42 communicates the list of mobile station identifiers to the SCMD 44. In turn, the SCMD 44 confirms whether a respective mobile station 13 can execute the recommended application and the price for the requested application. Prices can vary according to mobile station make, model, and operating system. Of course, other parameters can affect pricing.

The SMCD 44 returns the requested information to the GPMD 42. For those mobile stations 13 that can not execute the recommended application, the GPMD 42 cooperates with the elements of the mobile traffic network 21 (e.g., SMSC 39) to transmit an SMS message to the recommending mobile station 13 that indicates which of the mobile station can not execute the recommended application. Said another way, in our example, the recommending mobile station 13 is notified which, if any, of the identified mobile stations can not execute the recommended application. Of course, the network could also or as an alternative provide a response notifying the recommending mobile station 13 as to which, if any, of the identified mobile stations can execute the recommended application.

The GPMD 42 transmits provisioning information related to each of the mobile stations that can execute the recommended application to the ZPD 43. In turn, the ZPD 43 prepares, by communicating with the application server 32, the various versions of the recommended mobile station application for transmission to those mobile stations that can execute the recommended application. That is, various versions of the recommended application can exist for different makes and models of mobile stations. The provisioning information can include items such as the price of the application, the network address of the application server 32, and other information. After completing the provisioning of the recommended application, the ZPD 43 notifies the GPMD 42. In response, the GPMD cooperates with the network elements of the mobile traffic network 21 to transmit an SMS message recommending the mobile station application to each identified mobile station that is capable of executing the recommended application. Of course, an EMS or MMS message can also be used. If the end-user of a mobile station receiving the recommendation accepts the recommendation, the application is transmitted from the application server 32 to the accepting mobile station 13.

As outlined above, the example uses SMS type messaging transport through the network 10 to make and distribute the application recommendations among users' mobile stations 13. A SMS message includes source and destination address fields. For messages from a user device, the source address is the MDN of the sending customer's mobile station. For example, a SMS message sent from a mobile station 13 includes the MDN of the mobile station 13 as the identifier of the source of the message. The destination address may be a MDN of a destination station 13 or some other form of recognizable address. Of note for purposes of this discussion of recommendations of mobile station applications, one type of alternative address is a short code, typically four, five, six, eight, or twelve digits. The network 10 routes a SMS message with a MDN destination address all the way through to the addressed mobile station 13, however, the network 10 routes a SMS message with a short code destination address to a service provider application corresponding to the short code.

SMS routing thus allows use of short codes as a mechanism to route messages to/from a service provider, as opposed to communication of messages between end user devices. For this purpose, the short code is recognized by a control application in the network as being a message to a service provider as opposed to a message between SMS user devices, and the control application translates the short code to direct the message to the appropriate service provider platform. Depending on the service, the application may process the message, e.g. to count votes; or the network application may translate the short code to a destination address, e.g. an IP address of an external customer's server, such as the ESME server of a VASP.

In the example, the group provisioning manager device 42 would have an assigned short code. Hence, the SMSC 39 routes outgoing messages received through the mobile network 10 from mobile stations like, which have a short code for the message destination address of the group provisioning manager device 42, through the network 36 to that device 42.

Recommendation messages for application capable mobile stations 13, sent by the group provisioning manager device 42, would be sent through the network 36 to the appropriate SMSC 39. Each such incoming message would include the MDN of an identified mobile station 13, and the SMSC and other elements of the network 21 would deliver the SMS message to the appropriate station based on the MDN as the message destination address.

With reference to FIG. 2, a method of recommending an application from a recommending mobile station 13 is shown and described. The method begins with the user selection an application for recommendation and selecting mobile stations to recommend the application to (S1). In response, a SMS message addressed to short code (e.g., 2777) for the application download/recommendation service is generated. The message can be created during the purchase of the recommended application by the end-user of the requesting mobile station. Also, the message can be created after the purchase of the recommended application by the recommending mobile station 13. That is, the application can be recommended at any time after it is installed on the recommending mobile station 13.

The recommending message includes an identification of the recommended application. For example, a keyword or application ID can be used. In addition, one or more mobile stations 13 that are to receive the recommendation are selected. The mobile stations can be selected from the end-user's address book resident on the requesting mobile station 13 or they can be added by inputting the MDN(s) during the message creation.

The SMSC 39, or another network element, receives the SMS message. In response, the SMSC 39 processes the message, and based on the short code, delivers (S2) the message with the application identifier (e.g., keyword) and the list of one or more MDNs to the GPMD 42. After processing, the MDNs (or if required MINs) and the application identifier are forwarded (S3) to the SCMD 43.

The SCMD 43 process each of the mobile station identifiers (e.g., MDNs) and determines whether each respective mobile station 13 can execute the recommended application. For each mobile station that can execute the recommended application, a price for the application is also determined by the SCMD 43. The results of the processing by the SCMD 43 are returned to the GPMD 42. If one or mobile stations is not able to execute the recommended application, the GPMD 42 causes the SMSC 39 to notify (S4) the recommending mobile station 13 of the situation. The notification can be in the form a messaging service message (e.g., SMS). The GPMD 42 also receives information related to which of the selected mobile stations 13 can execute the recommended mobile station application and the pricing information. For those mobile stations, a provisioning request is sent (S5) to the ZPD 44.

The ZPD 44 prepares the various versions of the recommended application for transmission to the various mobile stations 13 using provisioning information provided from the SCMD 43. The provisioning information can include items such as the price of the application, the network address of the application server 32, and other information. Once complete, the ZPD 44 notifies the GPMD 42 that the application(s) are ready for transmission to the respective mobile stations.

In response, the GPMD 42 causes the SMSC 39 to transmit (S6) download instructions to the respective mobile stations. Additional information can be included in the transmission. For example, pricing information can be included as well as the identity of the recommending user. The download instruction can be in the form of an SMS message or other messaging service message formats (e.g., EMS or MMS). The SMSC 39 transmits the messages to the respective mobile stations. For those that choose to accept the recommendation, the mobile stations communicate (S7) with the application server and download the recommended application.

In another example, instead of transmitting download instructions the end-user is informed of the recommendation by executing another mobile station application. For example, if the end-user launches their "application" mobile station application, a folder called "recommendations" appears list includes within it the requested application and pricing information.

Figures 3, 4:
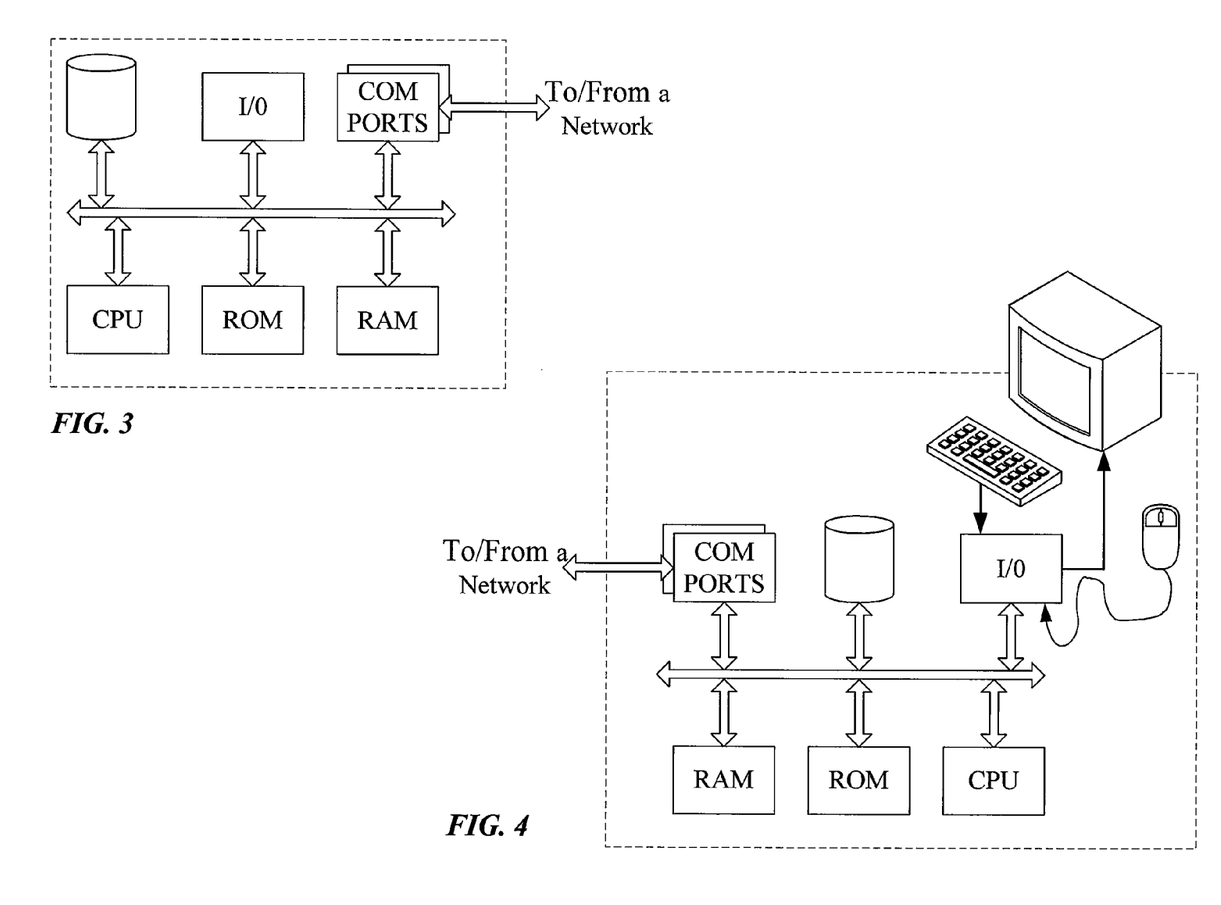
FIG. 3 is a simplified functional block diagram of a computer that may be configured as a host or server.
FIG. 4 is a simplified functional block diagram of a personal computer or other work station or terminal device.

FIGS. 3 and 4 provide functional block diagram illustrations of general purpose computer hardware platforms. FIG. 3 illustrates a network or host computer platform, as may be used to implement a server or other network element (e.g., SMSC 29, GPMD 42 . . . ). FIG. 4 depicts a computer with user interface elements, as may be used to implement a personal computer (PC) or other type of work station or terminal device, although the computer of FIG. 4 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of recommending an application can be executed on a mobile station and on a network element such as a server. Program aspects of the technology may be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, recommended application can be communicated to the mobile station 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the data aggregator, the customer communication system, etc. shown in the drawings. Volatile storage media include dynamic memory, such as main memory of such a computer platform.

Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution Those skilled in the art will recognize that the present teachings are amenable to a variety of modifications and/or enhancements. For example, although some aspects of the present disclosure describes recommending the application from a recommending mobile station 13, the recommendation can also originate from the PC 11 while the end-user is access their mobile account information via the customer account web server 41.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2: 3rd generation partnership project 2
BREW: binary runtime environment for wireless
BS: base station
BTS: base transceiver system
CDMA: code division multiple access
CD-ROM: compact disc read-only memory
DNDA: do not disturb application
DVD: digital video disc
DVD-ROM: digital versatile (video) disc read-only memory
EPROM: erasable programmable read-only memory
EV-DO: evolution-data optimized
ESN: electronic serial number
GPMD: group provisioning manager device
GSM: global system for mobile communications
HLR: home location register
IP: Internet protocol
IR: infrared
LBS: location based services
LCD: liquid crystal display
LTE: long-term evolution
MC: message center
MIN: mobile identification number
MPC: mobile positioning center
MS: mobile station
MSC: mobile switching center
PC: personal computer
PN: pseudo-random noise
PROM: programmable read-only memory
PSTN: public switched telephone network
RAM: random access memory
RAN: radio access network
RF: radio frequency
SCMD: service creation manager device
SIF: Standard Interchange Format
SMS: short messaging service
SS7: signaling system 7
STP: signaling transfer points
TCP: transmission control protocol
TDMA: time-division multiple access
UMTS: universal mobile telecommunications system
USB: universal serial bus
VLR: visitor location register
WAN: wide are network
XCVR: transceiver
ZPD: zone provisioning device

What is claimed is:

1. A method of recommending and downloading a mobile station application to an end-user of a mobile station, the method comprising steps of:

receiving a mobile messaging service message recommending the mobile station application, through a mobile communication network from a recommending mobile station, the received recommending message comprising an application identifier associated with the recommended mobile station application and one or more mobile station identifiers of mobile stations to which to recommend the application;

responsive to receiving the mobile messaging service message recommending the mobile station application and for each of the one or more mobile station identifiers received in the mobile messaging service message recommending the mobile station application, determining whether a corresponding mobile station is capable of executing the recommended mobile station application, to identify only those mobile stations capable of executing the recommended mobile station application;

storing provisioning information with respect to the recommended mobile station application to prepare the recommended mobile station application for transmission to each of those mobile stations identified as being capable of executing the recommended mobile station application;

upon completion of storing the provisioning information, transmitting a mobile messaging service message recommending the mobile station application through the mobile communication network to only those mobile stations identified as being capable of executing the recommended mobile station application;

receiving a response to the transmitted message through the mobile communication network from a responding mobile station among those mobile stations identified as being capable of executing the recommended mobile station application; and downloading the recommended mobile station application through the mobile communication network to the responding mobile station.

2. The method of claim 1, further comprising transmitting to the recommending mobile station an indication of those mobile stations not identified as able to execute the recommended mobile station application.

3. The method of claim 1, wherein the recommended mobile station application is a Binary Runtime Environment for Wireless (BREW) application.

4. The method of claim 1, wherein the received recommendation messaging service message is addressed to a short code that indicates that the messaging service message contains an application recommendation.

5. The method of claim 1, wherein receiving the recommendation messaging service message occurs during the purchase of the mobile station application by the recommending mobile station.

6. The method of claim 1, wherein receiving the recommendation messaging service message occurs after the purchase of the mobile station application by the recommending mobile station.

7. The method of claim 1, wherein the application identifier associated with the recommended application comprises an alphanumeric string.

8. The method of claim 7, wherein the alphanumeric string of the application identifier comprises a keyword.

9. The method of claim 1, further comprising determining a price for the recommended mobile station application and storing the determined price as part of the stored provisioning information.

10. The method of claim 9, wherein the step of determining a price for the recommended mobile station application comprises:
for each of only those mobile stations identified as being capable of executing the recommended mobile station application, determining at least one of a mobile station make, model, and operating system; and
determining a price for the recommended application for each mobile station identified as being capable of executing the recommended mobile station application based on the determined one of the mobile station make, model, and operating system.

11. The method of claim 1, wherein each of the one or more mobile station identifiers of mobile stations comprises a mobile directory number (MDN).

12. The method of claim 1, wherein the mobile messaging service message recommending the mobile station application and transmitted to only those mobile stations identified as being capable of executing the recommended mobile station application includes an identifier for a user of the recommending mobile station.

13. The method of claim 1, wherein an end-user of one of only those mobile stations identified as being capable of executing the recommended mobile station application is notified of receipt on the one of only those mobile stations of the mobile messaging service message recommending the mobile station application in response to the end-user launching an application on the one of only those mobile stations.

14. The method of claim 1, further comprising:
for each of only those mobile stations identified as being capable of executing the recommended mobile station application, determining at least one of a mobile station make, model, and operating system;
determining a price for the recommended mobile station application for each of only those mobile stations identified as being capable of executing the recommended mobile station application based on the determined one of the mobile station make, model, and operating system; and
storing the determined price as part of the stored provisioning information.

15. A mobile communication network, comprising:
a service creation manager device that stores information related to whether a mobile station can execute a mobile station application;
a zone provisioning network device that communicates with an application server to prepare a mobile station application for transmission to a mobile station; and
a group provisioning manager network device in communication with the service creation manager and the zone provisioning network device, the group provisioning manager network device configured to perform functions comprising:
receiving a mobile messaging service message recommending the mobile station application, the received recommending message comprising an application identifier associated with the recommended mobile station application and one or more mobile station identifiers of mobile stations to which to recommend the mobile station application;
receiving an indication from the service creation manager device whether each of the those mobile stations identified in the recommendation messaging service message is capable of executing the recommended mobile station application;
transmitting provisioning information to the zone provisioning network device, the provisioning information used to prepare the recommended mobile station application for transmission to only those mobile stations capable of executing the recommended application;
receiving a response from the zone provisioning network device, the response indicating that the recommended mobile station application is prepared for transmission to only those mobile stations capable of executing the recommended application; and
transmitting, responsive to receiving the response, a messaging service message to only those mobile stations identified as capable of executing the recommended mobile station application, the message indicating that the mobile station application has been recommended.

16. The mobile communication network of claim 15, wherein:
the group provisioning manager network device is further configured to perform functions comprising receiving a response to the transmitted messaging service message from at least one of those mobile stations identified as being capable of executing the recommend application; and
the mobile communication network further comprises an application server device configured to perform functions comprising transmitting the recommended mobile station application to each mobile station that responded with a message indicating to download the recommended application.

17. The mobile communication network of claim 16, wherein the download messaging service message comprises a simple messaging service (SMS) message.

18. The mobile communication network of claim 15, wherein the application is a BREW application.

19. The mobile communication network of claim 15, wherein the service creation manager device, zone provisioning network device, and the group provisioning manager network device are the same device.

20. The mobile communication network of claim 15, wherein the service creation manager device, zone provisioning network device, and the group provisioning manager network device are different devices.

21. The mobile communication network of claim 15, wherein the application identifier associated with the recommended mobile station application comprises an alphanumeric string.

22. The mobile communication network of claim 21, wherein the alphanumeric string associated with the recommended mobile station application comprises a keyword.

23. The mobile communication network of claim 15, wherein the group provisioning manager network device is further configured to perform functions comprising receiving pricing information for the recommended application.

24. The mobile communication network of claim 15, wherein the received mobile messaging service message recommending the mobile station application is addressed to a short code.

* * * * *